US011504793B2

(12) United States Patent
Inoue et al.

(10) Patent No.: US 11,504,793 B2
(45) Date of Patent: *Nov. 22, 2022

(54) WIRE FEEDING DEVICE AND ARC WELDING DEVICE

(71) Applicant: DAIHEN Corporation, Osaka (JP)

(72) Inventors: Masahiro Inoue, Osaka (JP); Yukiya Morita, Osaka (JP); Hisao Miyahara, Osaka (JP); Gen Tsujii, Osaka (JP)

(73) Assignee: DAIHEN Corporation, Osaka (JP)

( * ) Notice: Subject to any disclaimer, the term of this patent is extended or adjusted under 35 U.S.C. 154(b) by 305 days.

This patent is subject to a terminal disclaimer.

(21) Appl. No.: 16/340,489

(22) PCT Filed: Oct. 6, 2017

(86) PCT No.: PCT/JP2017/036490
§ 371 (c)(1),
(2) Date: Apr. 9, 2019

(87) PCT Pub. No.: WO2018/074267
PCT Pub. Date: Apr. 26, 2018

(65) Prior Publication Data
US 2019/0247947 A1 Aug. 15, 2019

(30) Foreign Application Priority Data
Oct. 18, 2016 (JP) .............................. JP2016-204658

(51) Int. Cl.
B23K 9/12 (2006.01)
B23K 9/133 (2006.01)

(52) U.S. Cl.
CPC ............... *B23K 9/125* (2013.01); *B23K 9/12* (2013.01); *B23K 9/133* (2013.01); *B23K 9/1336* (2013.01)

(58) Field of Classification Search
CPC ...... B23K 9/124; B23K 9/1006; B23K 9/295; B23K 35/0261; B23K 9/1075;
(Continued)

(56) References Cited

U.S. PATENT DOCUMENTS 6,831,251 B1 * 12/2004 Artelsmair ........... B23K 9/1336
219/137.71
7,102,099 B2 9/2006 Huismann et al.
(Continued)

FOREIGN PATENT DOCUMENTS

CN 1816410 A 8/2006
CN 101786195 A * 7/2010
(Continued)

OTHER PUBLICATIONS

First Office Action for Chinese Application No. 201780062719.X dated Jul. 29, 2020, with its English translation, 15 pages.
(Continued)

*Primary Examiner* — Justin C Dodson
*Assistant Examiner* — Dilnessa B Belay
(74) *Attorney, Agent, or Firm* — Rudy J. Ng; Bret E. Field; Bozicevic, Field & Francis LLP

(57) ABSTRACT

A wire feeding device configured to feed welding wire from a wire feeding source to a welding torch is provided with: an intermediate wire feeding source that is disposed between the wire feeding source and the welding torch and is configured to temporarily store the welding wire fed from the wire feeding source and to feed the stored welding wire to the welding torch; a first feeding part that feeds the welding wire at the wire feeding source to the intermediate wire feeding source; a second feeding part that feeds the welding wire stored in the intermediate wire feeding source to the welding torch; and a feed control unit that controls
(Continued)

speed of feeding the welding wire by each of the first feeding part and the second feeding part.

1 Claim, 10 Drawing Sheets

(58) Field of Classification Search
CPC ...... B23K 26/1464; B23K 9/12; B23K 9/125; B23K 9/133; B23K 9/1336; B65H 2701/36; B65H 51/30; B65H 16/005; B65H 59/388; B21F 23/00; H02P 5/46
See application file for complete search history.

(56) References Cited

U.S. PATENT DOCUMENTS

| | | | |
|---|---|---|---|
| 8,704,132 B2 | 4/2014 | Artelsmair et al. | |
| 11,325,200 B2 * | 5/2022 | Sakaguchi | B23K 9/095 |
| 2004/0011776 A1 | 1/2004 | Mukai et al. | |
| 2004/0016737 A1 | 1/2004 | Huismann et al. | |
| 2006/0037952 A1 | 2/2006 | Myers et al. | |
| 2006/0124622 A1 | 6/2006 | Hubinger et al. | |
| 2007/0151964 A1 | 7/2007 | Artelsmair et al. | |
| 2007/0164074 A1 | 7/2007 | Schorghuber et al. | |
| 2013/0193124 A1 * | 8/2013 | Peters | B23K 9/1735 |
| | | | 219/121.63 |
| 2017/0165779 A1 | 6/2017 | Barhorst et al. | |

FOREIGN PATENT DOCUMENTS

| | | | |
|---|---|---|---|
| CN | 101786195 A | | 7/2010 |
| CN | 204018991 U | | 12/2014 |
| CN | 104661781 A | | 5/2015 |
| CN | 106735769 A | | 5/2017 |
| DE | 4320405 A1 | | 12/1994 |
| JP | S55-77980 A | | 6/1980 |
| JP | S55-077981 A | | 6/1980 |
| JP | S60-184470 A | | 9/1985 |
| JP | H10-6057 A | | 1/1998 |
| JP | H1190627 A | | 4/1999 |
| JP | 2003-039169 A | | 2/2003 |
| JP | 2006-000907 A | | 1/2006 |
| JP | 2006-326679 A | | 12/2006 |
| JP | 2007-518568 A | | 7/2007 |
| JP | 2010-52021 A | | 3/2010 |
| JP | 2010-207876 A | | 9/2010 |
| JP | 2013038864 A | * | 2/2013 |
| JP | 2015-058469 A | | 3/2015 |
| WO | WO2014013322 A2 | | 1/2014 |
| WO | WO2017155041 A1 | | 9/2017 |

OTHER PUBLICATIONS

Notice of Reasons for Refusal for Japanese Application No. 2018-546256 dated Jun. 29, 2021, with its English translation, 7 pages.
English Translation of International Search Report for PCT/JP2017/036490 dated Nov. 21, 2017, 2 pages.
Extended European Search Report for European Application No. 17861991.2 dated Jun. 15, 2020, 7 pages.
Extended European Search Report for European Patent Application No. 19153217.5 dated Jul. 30, 2019, 9 pages.
Office Action for Chinese Patent Application No. 201910055694.1 dated Aug. 13, 2021, 8 pages.
Office Action for U.S. Appl. No. 16/250,577 dated Feb. 24, 2021, 25 pages.
Final Office Action for U.S. Appl. No. 16/250,577 dated Jul. 27, 2021, 6 pages.
Notice of Allowance for U.S. Appl. No. 16/250,577 dated Sep. 24, 2021, 13 pages.

* cited by examiner

WIRE FEEDING DEVICE AND ARC WELDING DEVICE

CROSS-REFERENCE TO RELATED APPLICATIONS

This application is the national phase under 35 U. S. C. § 371 of PCT International Application No. PCT/JP2017/036490 which has an International filing date of Oct. 6, 2017 and designated the United States of America.

FIELD

The present disclosure relates to a wire feeding device that feeds welding wire to a welding torch, and an arc welding device.

BACKGROUND

An arc welding system of a consumable electrode type is provided with: a wire feeding device that feeds welding wire from a wire feeding source to a welding torch; and a power supply device. The wire feeding device of a push-pull type is provided with a push feeder that pushes out welding wire from a wire feeding source such as a wire reel, pack wire or the like to a welding torch, and a pull feeder that is located at an arm or the like of a welding robot and that pulls in the welding wire pushed out by the push feeder to feed it to the welding torch. Generally, the push feeder is torque-controlled, whereas the pull feeder is speed-controlled (Japanese Patent Application Laid-Open, for example).

In Japanese Patent Application Laid-Open Publication No. 2006-907, however, the push feeder being torque-controlled deteriorates the response for the wire feeding speed, so that the push side would not be able to follow any abrupt change in the feeding speed on the pull side, causing problems of, for example, slipping or buckling of the welding wire. This problem is particularly significant in large current welding which requires high-speed feeding of welding wire.

Moreover, torque adjustment is required on the push side in accordance with the state of the welding wire path and the wire diameter.

The present disclosure has been made in view of the circumstances described above, and aims to provide a wire feeding device and an arc welding device capable of stably feeding welding wire to a welding torch at a required speed.

SUMMARY

A wire feeding device according to an aspect of the present disclosure configured to feed welding wire from a wire feeding source to a welding torch is provided with: an intermediate wire feeding source that is disposed between the wire feeding source and the welding torch and is configured to temporarily store the welding wire fed from the wire feeding source and to feed the stored welding wire to the welding torch; a first feeding part that feeds the welding wire at the wire feeding source to the intermediate wire feeding source; a second feeding part that feeds the welding wire stored in the intermediate wire feeding source to the welding torch; and a feed control unit that controls speed of feeding the welding wire by each of the first feeding part and the second feeding part.

According to an aspect of the present disclosure, since speed control is performed for wire feeding by both the first feeding part and the second feeding part, basically no problem of delay in following is caused in the feeding speed of the first feeding part with respect to the second feeding speed, thereby achieving high response to wire feeding. Since the intermediate wire feeding source is provided between the first feeding part and the second feeding part, it is not necessary to highly precisely synchronize the first feeding part with the second feeding part, and the welding wire may stably be fed to the welding torch at a required speed. Furthermore, the wire feeding device according to an aspect of the present disclosure requires no torque adjustment which is required in torque control.

In the wire feeding device according to an aspect of the present disclosure, the feed control unit controls the speed of feeding by each of the first feeding part and the second feeding part so that the feeding speed of welding wire is substantially equal to each other.

According to an aspect of the present disclosure, as the feeding speed of welding wire fed by the first feeding part and the second feeding part is substantially equal to each other, the welding wire may stably be fed to the welding torch at the feeding speed.

The wire feeding device according to an aspect of the present disclosure includes a detection unit that detects the stored amount of welding wire stored in the intermediate wire feeding source, and the feed control unit corrects the feeding speed of welding wire fed by the first feeding part so that a predetermined amount of welding wire is stored in the intermediate wire feeding source based on the detection result obtained by the detection unit.

According to an aspect of the present disclosure, the feeding speed of welding wire fed by the first feeding part is corrected so that a predetermined amount of welding wire is stored in the intermediate wire feeding source. Even if a difference is generated in the feeding speed of welding wire between the first feeding part and the second feeding part, the predetermined amount of welding wire is secured in the intermediate wire feeding source 41, and the welding wire may stably be fed to the welding torch.

In the wire feeding device according to an aspect of the present disclosure, the predetermined amount has an upper limit and a lower limit, and if the stored amount detected by the detection unit is larger than the upper limit, the feed control unit corrects the feeding speed of welding wire fed by the first feeding part so as to decrease the feeding speed in accordance with a difference between the stored amount and the upper limit, whereas if the stored amount detected by the detection unit is smaller than the lower limit, the feeding speed of wire fed by the first feeding part is corrected so as to increase the feeding speed in accordance with the difference between the stored amount and the lower limit.

According to an aspect of the present disclosure, the welding wire of an amount in a range from a predetermined lower limit to an upper limit is secured in the intermediate wire feeding source. If the stored amount of welding wire is larger than the upper limit, the feeding speed of the first feeding part is decreased so as to reduce the stored amount. If, on the other hand, the stored amount of welding wire is smaller than the lower limit, the feeding speed of the first feeding part is increased so as to increase the stored amount.

In the wire feeding device according to an aspect of the present disclosure, the feed control unit corrects the feeding speed of welding wire fed by the first feeding part so as to decrease the feeding speed if the change rate of the stored amount is a positive value in the case where the stored amount detected by the detection unit is in a range from the lower limit to the upper limit, and corrects the feeding speed of welding wire fed by the first feeding part so as to increase the feeding speed if the change rate of the stored amount is a negative value.

According to an aspect of the present disclosure, in the case where the welding wire of an amount in a range from a predetermined lower limit to an upper limit is in the intermediate wire feeding source, the stored amount of welding wire is stabilized at the current stored amount. This may prevent variation in the amount of welding wire stored in the intermediate wire feeding source, which thus can stabilize the stored state of welding wire in the intermediate wire feeding source, and can stably supply the welding wire to the welding torch.

The arc welding device according to an aspect of the present disclosure comprises: the wire feeding device as described above; and a power supply device that supplies welding current to the welding wire to be fed to a base material by the wire feeding device, and generates arc between a tip end of the welding wire and a portion to be welded, to weld the base material.

According to an aspect of the present disclosure, welding wire may stably be fed to a welding torch at a required speed to perform arc welding for the base material.

In the arc welding device according to an aspect of the present disclosure, the power supply device includes the first power supply and the second power supply that are connected in parallel, the feed control unit includes a first control unit that is located at the first power supply and that controls the speed of feeding by the first feeding part, and a second control unit that is located at the second power supply and that controls the speed of feeding by the second feeding part. The second power supply includes a transmission unit that transmits speed information indicating the feeding speed of welding wire fed by the second feeding part to the first power supply, the first power supply includes a reception unit that receives speed information transmitted from the second power supply, and the first control unit controls the speed of feeding by the first feeding part based on the speed information received by the reception unit.

According an aspect of the present disclosure, the power supply device includes at least two power supplies that are connected in parallel, that is, the first power supply and the second power supply. The first control unit located at the first power supply controls the speed for the first feeding part, whereas the second control unit located at the second power supply controls the speed for the second feeding part. The second power supply transmits speed information indicating the feeding speed of welding wire fed by the second feeding part to the first power supply, and the first power supply receives speed information transmitted from the second power supply. The first control unit controls the speed of feeding by the first feeding part based on the speed information. Accordingly, even in the configuration where each of the power supplies is provided with only one port for outputting a command for speed to the feeding parts, the feeding speed of welding wire by both the first feeding part and the second feeding part may be controlled.

According to an aspect of the present disclosure, welding wire may stably be fed to a welding torch at a required speed.

The above and further objects and features will more fully be apparent from the following detailed description with accompanying drawings.

DETAILED DESCRIPTION

The present disclosure will be described below in detail with reference to the drawings illustrating the embodiments thereof. At least some parts of the embodiments described below may arbitrarily be combined together.

Embodiment 1

Figure 1:
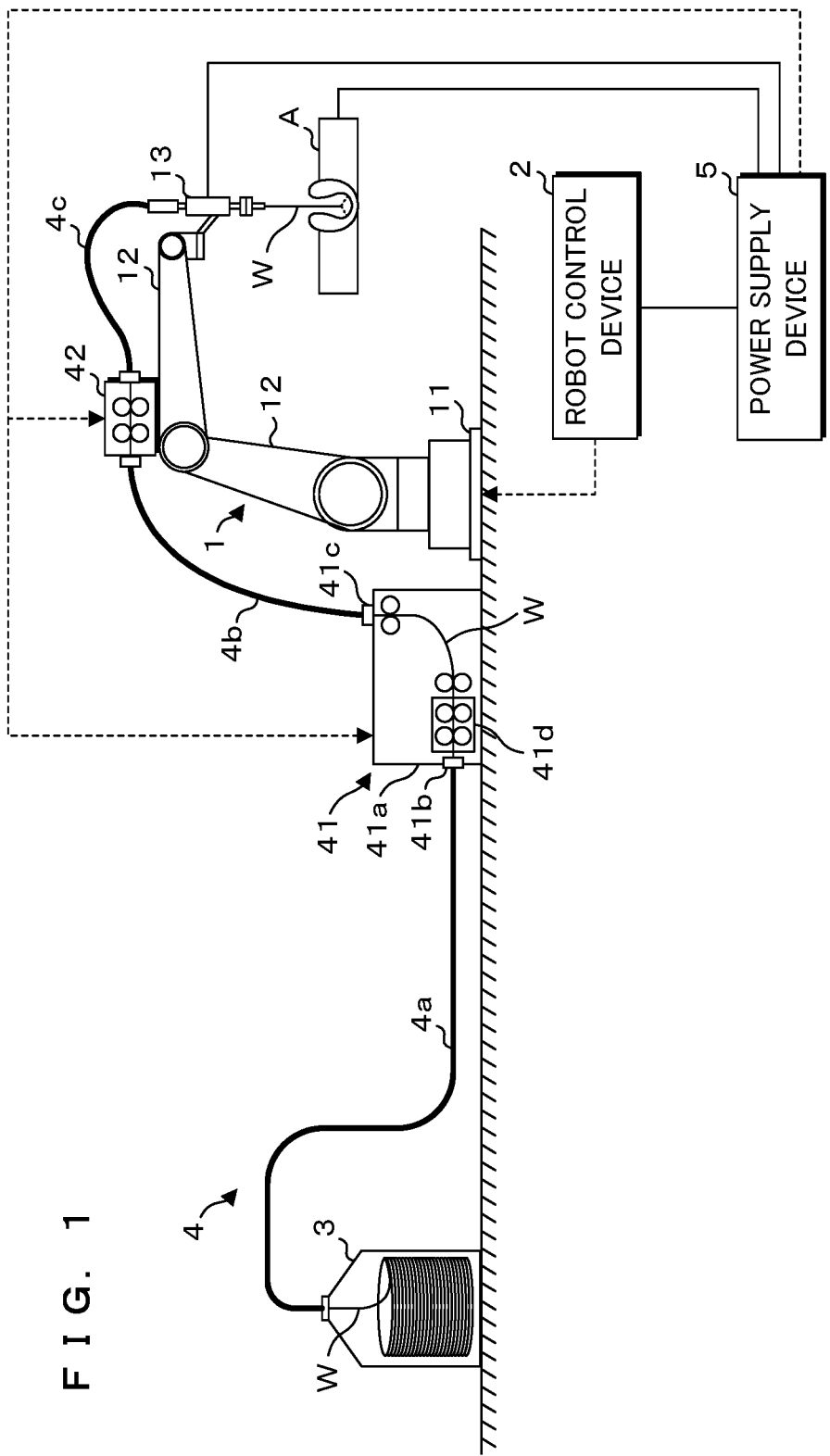
FIG. 1 is a schematic diagram illustrating a configuration example of an arc welding system according to Embodiment 1.

FIG. 1 is a schematic diagram illustrating a configuration example of an arc welding system according to Embodiment 1. An arc welding system according to the present embodiment is a gas shield arc welding machine of a consumable electrode type that includes a welding robot 1, a robot control device 2, a wire feeding source 3, a wire feeding device 4 and a power supply device 5.

The welding robot 1 automatically performs arc welding of a base material A. The welding robot 1 includes a base 11 fixed to an appropriate position on a floor surface. To the base 11, multiple arms 12 are rotatably connected via a shaft (not illustrated). A welding torch 13 is held at the tip end of the arm 12 connected to the distal end side. A motor is provided at the connecting portion of the arms 12, to rotate the arms 12 around the shaft by the rotary drive force of the motor. The rotation of the motor is controlled by the robot control device 2. The robot control device 2 may move the welding torch 13 with respect to the base material A in the upper, lower, front, back, left and right directions by rotating the arms 12. Moreover, at the connecting portion of the arms 12, an encoder is located that outputs a signal indicating a rotated position of each arm 12 to the robot control device 2, which recognizes the position of the welding torch 13 based on the signal output from the encoder.

The welding torch 13 is made of conductive material such as copper alloy, and has a cylindrical contact chip which guides welding wire W to the base material A to be welded while supplying welding current required to generate arc. The contact chip makes contact with welding wire W penetrating into the contact chip, and supplies welding current to the welding wire W. Moreover, the welding torch 13 has a nozzle having a hollow cylindrical shape surrounding the contact chip for spraying shield gas to the base material A through an opening at the tip end. The shield gas is to prevent oxidation of the base material A melted by the arc as well as the welding wire W. The shield gas is, for example, carbon dioxide gas, mixed gas containing carbon dioxide gas and argon gas, or inert gas such as argon.

The wire feeding source 3 stores the welding wire W so as to veer out the welding wire W to the welding torch 13. The welding wire W is, for example, solid wire having a diameter of 0.8 mm to 1.6 mm, and functions as a consumable electrode. The wire feeding source 3 is a pack wire stored into a pail pack while being wound in a helical manner, or a reel wire wound around a wire reel.

The wire feeding device 4 is provided with an intermediate wire feeding source 41 that is disposed between the wire feeding source 3 and the welding torch 13 and is configured to temporarily store the welding wire W fed from the wire feeding source 3 and to feed the stored welding wire W to the welding torch 13.

Figure 2:
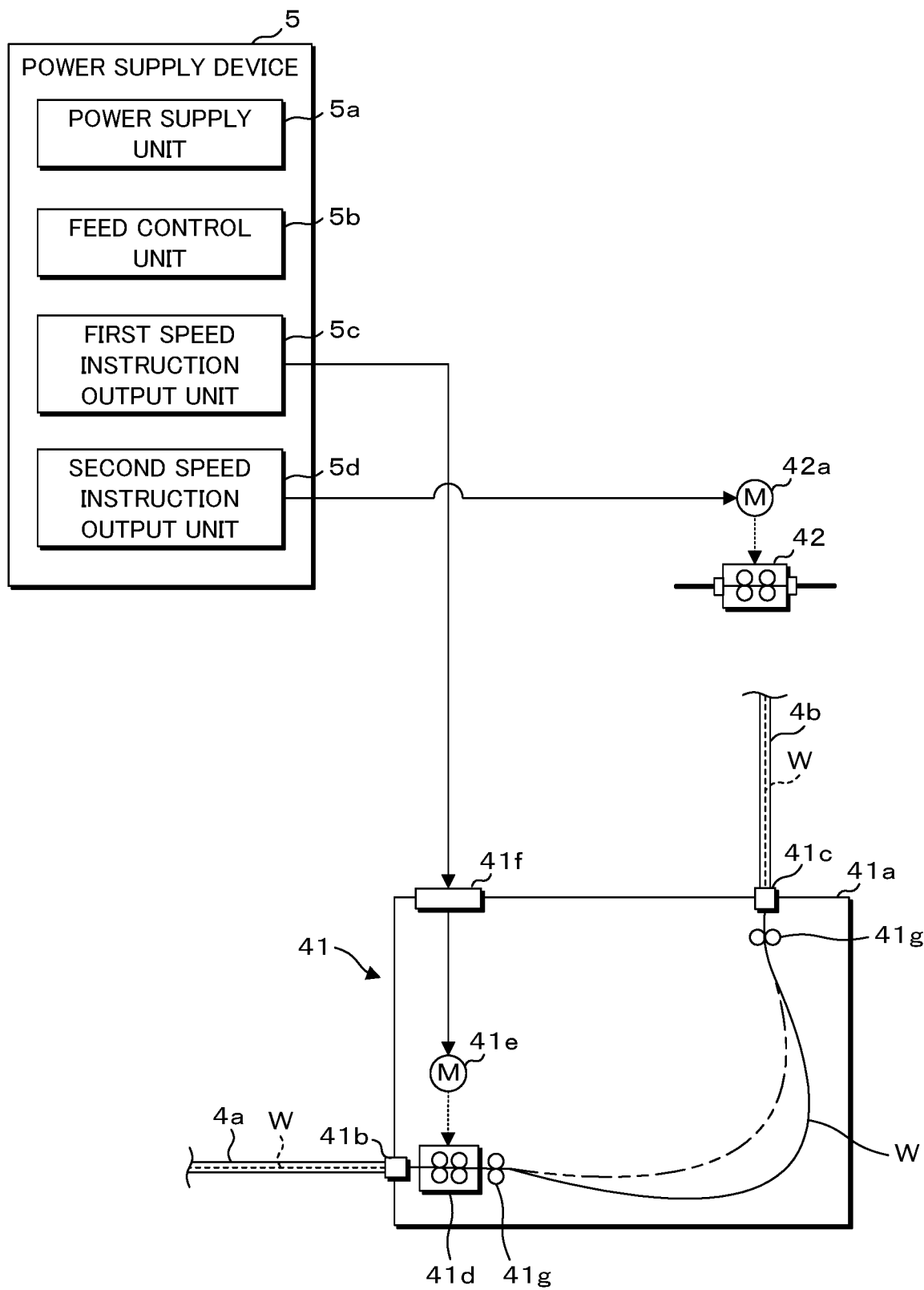
FIG. 2 is a schematic diagram illustrating a configuration example of an intermediate wire feeding source and a power supply device according to Embodiment 1.

FIG. 2 is a schematic diagram illustrating a configuration example of an intermediate wire feeding source 41 and a power supply device 5 according to Embodiment 1. The intermediate wire feeding source 41 is to absorb the difference in the wire feeding speed between different parts in the feed path, and also to reduce the feeding load of the welding wire W on the welding torch 13 side. The intermediate wire feeding source 41 has a hollow substantially-rectangular-parallelepiped housing 41a that stores the welding wire W. An inlet part 41b through which the welding wire W fed from the wire feeding source 3 is formed on a side surface of the housing 41a, and an outlet part 41c through which the welding wire W stored inside the housing 41a is sent out are formed on an upper surface of the housing 41a. The welding wire W pulled into the housing 41a is stored in a state of being bent in an arc between the inlet part 41b and the outlet part 41c.

The wire feeding source 3 and the inlet part 41b of the intermediate wire feeding source 41 are connected via the first conduit cable 4a through which the welding wire W passes. At the inlet part 41b inside the housing 41a, a first feeding part 41d that pulls out the welding wire W from the wire feeding source 3 and pushes the welding wire W into the housing 41a through the inlet part 41b is provided. The first feeding part 41d has a pair of rollers that are opposed to each other at positions where the rollers can hold the welding wire W introduced through the inlet part 41b between them. At least one of the rollers is rotary driven by a first motor 41e which is capable of controlling the speed.

The first feeding part 41d may feed the welding wire W at a speed of 30-100 meters per minute, for example. The intermediate wire feeding source 41 is provided with an input port 41f through which a speed instruction signal output from the power supply device 5 is input, and the first motor 41e rotates a roller at a speed according to the speed instruction signal input to the input port 41f. The first motor 41e detects the rotation speed of the roller by an encoder (not illustrated), for example, and operates so as to rotate the roller at a rotation speed according to the speed instruction signal.

The welding wire W pulled into the housing 41a from the first conduit cable 4a through the inlet part 41b is curved into an arbitrary shape, and a predetermined amount of welding wire W is stored into the housing 41a. In the example illustrated in FIG. 2, the welding wire W is stored while being curved into an arc. A member for guiding the welding wire W may be provided inside the housing 41a so that the welding wire W is stored in a predetermined spatial area without being entangled. A guide roller 41g, for example, is located at each of the inlet part 41b and the outlet part 41c inside the housing 41a. More specifically, the guide roller 41g on the inlet part 41b side is disposed at the outlet side of the first feeding part 41d and has a pair of rollers that are opposed to each other at positions where the rollers can hold the welding wire W between them and guide it from the inlet part 41b into the housing 41a. The guide roller 41g on the outlet part 41c side has a pair of rollers opposed to each other at positions where the rollers can hold the welding wire W between them and guide it from an inside of the housing 41a to the outlet part 41c. It is noted that the guide roller 41g may be configured to be rotary driven by a motor which rotates in synchronization with the first motor 41e, or be passively rotated.

Moreover, the wire feeding device 4 is provided with a second feeding part 42 that pulls out the welding wire W from the intermediate wire feeding source 41 and feeds the pulled-out welding wire W to the welding torch 13. The second feeding part 42 is located, for example, at the arm 12 of the welding robot 1, as illustrated in FIG. 1. The second feeding part 42 is connected to the outlet part 41c of the intermediate wire feeding source 41 by a second conduit cable 4b through which the welding wire W passes, and is connected to the welding torch 13 by a third conduit cable 4c. The intermediate wire feeding source 41 is aligned with and in the vicinity of the welding robot 1. The second feeding part 42 has a pair of rollers that are opposed to each other at positions where the welding wire W may be held between them, and the rollers are rotated so as to pull out the welding wire W from the intermediate wire feeding source 41 and feeds the pulled-out welding wire W to the welding torch 13. At least one of the rollers is rotary driven by a second motor 42a which is capable of controlling the speed. The second feeding part 42 may feed the welding wire W at a speed of 30-100 meters per minute, for example. The second feeding part 42 rotates the rollers based on a speed instruction signal output from the power supply device 5. The second motor 42a detects the rotation speed of the roller by an encoder (not illustrated), for example, and operates so as to rotate the roller at a rotation speed according to the speed instruction signal.

The power supply device 5 is connected to the contact chip of the welding torch 13 and the base material A via the power supply cable, and includes a power supply unit 5a that supplies welding current, a feed control unit 5b that controls the feeding speed of the welding wire W, a first speed instruction output unit 5c and a second speed instruction output unit 5d that output speed instruction signals respectively to the first feeding part 41d and the second feeding part 42.

The power supply unit 5a is an insulating switching power supply, which performs AC/DC conversion on the alternating current into required direct current, and supplies the converted direct current to the load. More specifically, the power supply unit 5a includes a power supply circuit that outputs PWM-controlled direct current, a signal processing unit that controls the operation of the power supply circuit, a voltage detection unit, a current detection unit, and so forth. The voltage detection unit detects voltage applied to the welding torch 13 and the base material A, and outputs a voltage value signal indicating the detected voltage value to the signal processing unit. The current detection unit detects, for example, welding current supplied from the power supply device 5 to the welding wire W via the welding torch 13 and flows through the arc, and outputs a current value signal indicating the detected current value to the signal processing unit. The signal processing unit outputs a signal for PWM-controlling the power supply circuit to the power supply circuit, based on a voltage value signal, a current value signal, a set value for the welding condition and the like. The power supply circuit includes, for example, an AC-DC converter performing AC-DC conversion on commercial alternate current, an inverter circuit converting direct current subjected to AC-DC conversion into required alternate current by switching, and a rectification circuit rectifying the alternate current obtained by conversion. The power supply circuit performs PWM control on the inverter circuit in accordance with the signal output from the signal processing unit, and outputs predetermined welding current and voltage to the welding wire W. For example, welding voltage that varies periodically is applied between the base material A and the welding wire W, and the welding current flows. The power supply device 5 is configured to receive an output instruction signal from the robot control device 2 via a control communication line. The power supply unit 5a starts supplying welding current to the power supply circuit using the output instruction signal as a trigger.

When the power supply unit 5a starts supplying the welding current, the feed control unit 5b causes the first speed instruction output unit 5c and the second speed instruction output unit 5d to output speed instruction signals indicating the feeding speed according to welding conditions to the first feeding part 41d and the second feeding part 42, respectively. The speed instruction signal output to the first feeding part 41d is substantially equal to the speed instruction signal output to the second feeding part 42, and the first feeding part 41d and the second feeding part 42 feed the welding wire W at substantially the same speed. It is noted that the speed instruction signals to be output to the first feeding part 41d and the second feeding part 42 are not necessarily identical to each other, since a difference exists in the diameters of the rollers constituting the first feeding part 41d and the second feeding part 42. Substantially equal speed instruction signals include signals that are different from each other within such a range that no problem of slipping, buckling or the like of the welding wire W occurs and that the welding wire W of a predetermined amount is stored in the intermediate wire feeding source 41.

As described above, in the wire feeding device 4 and arc welding device according to Embodiment 1, the feed control unit 5b of the power supply device 5 outputs substantially equal speed instruction signals according to welding conditions to the first feeding part 41d and the second feeding part 42, to control the speed of feeding the welding wire W by the first feeding part 41d and the second feeding part 42. The first feeding part 41d and the second feeding part 42 rotate the rollers in accordance with speed control signals output from the power supply device 5, and feed the welding wire W at a required speed.

This can prevent a delay in following the feeding speed, which may be a problem of torque control, from occurring, and achieve a high response performance in wire feeding. Since the intermediate wire feeding source 41 is provided, it is not necessary to highly precisely synchronize the welding wire W fed by the first feeding part 41d and the second feeding part 42, and still the welding wire W may stably be fed to the welding torch 13 at a required speed.

Furthermore, the welding wire W is stored into the intermediate wire feeding source 41 in a state of being bent in an arc between the inlet part 41b and the outlet part 41c. Therefore, compared to the case where the welding wire W is largely bent such as in a loop to be stored into the housing 41a, the feeding load may be reduced. Also, compared to the case where the welding wire W is stored in a loop, the internal structure of the housing 41a may be simplified.

Furthermore, as the first feeding part 41d and the second feeding part 42 are speed-controlled, the difference in the feeding speed may be suppressed to the minimum, and thus the housing 41a may be reduced in size.

In addition, even in the case where the feeding load of the welding wire W between the wire supply source 3 and the intermediate wire feeding source 41 is large, the welding wire W may stably be fed from the intermediate wire feeding source 41 to the welding torch 13. For example, even in the case where the wire feeding source 3 is located at a position distant from the welding robot 1 and thus the first conduit cable 4a is long, the welding wire W may stably be fed to the welding torch 13.

While Embodiment 1 described the example where the first feeding part 41d is located inside the housing 41a of the intermediate wire feeding source 41, the first feeding part 41d and the intermediate wire feeding source 41 may be formed as separate units. The position of the separate first feeding part 41d is not necessarily limited, and may be at the wire feeding source 3.

While the example where the intermediate wire feeding source 41 is arranged side by side with the welding robot 1 was described, the position of the intermediate wire feeding source 41 is not particularly limited but may alternatively be at the arm 12 of the welding robot 1.

While the present embodiment described a configuration including a set of intermediate wire feeding source 41 and first feeding part 41d in the wire feeding device 4, multiple sets of intermediate wire feeding sources 41 and first feeding parts 41d may be included.

Embodiment 2

As an arc welding device and a wire feeding device 204 according to Embodiment 2 are different from those in Embodiment 1 in the details of the intermediate wire feeding source 241 and the feed control method, the difference will mainly be described below. Since the other configurations and effects are similar to those in Embodiment 1, corresponding parts are denoted by similar reference codes and detailed description thereof will not be repeated.

Figure 3:
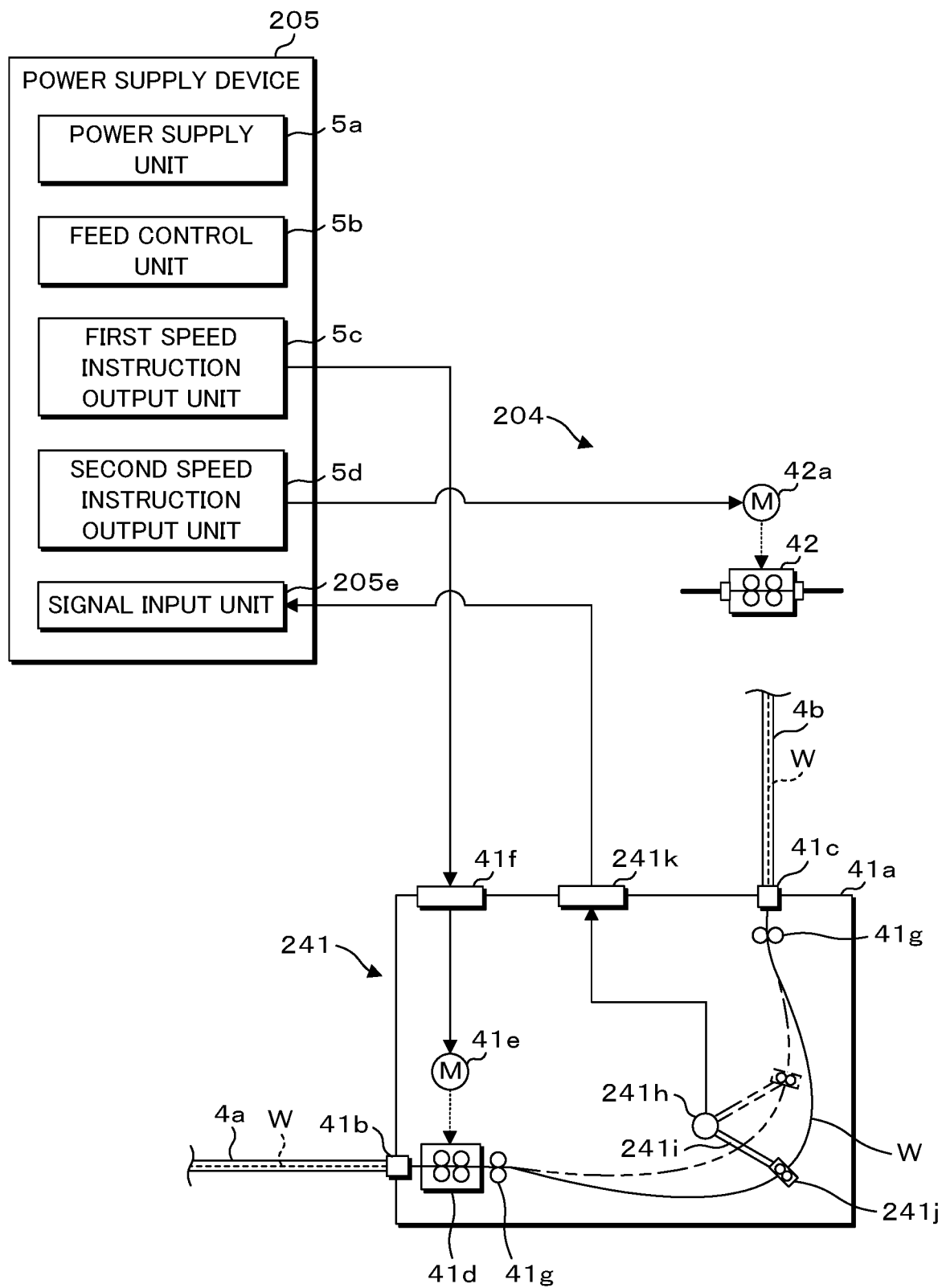
FIG. 3 is a schematic diagram illustrating a configuration example of an intermediate wire feeding source and a power supply device according to Embodiment 2.

FIG. 3 is a schematic diagram illustrating a configuration example of an intermediate wire feeding source 241 and a power supply device 205 according to Embodiment 2. The intermediate wire feeding source 241 according to Embodiment 2 includes a housing 41a which is similar to that in Embodiment 1, and is provided with an inlet part 41b, an outlet part 41c, a first feeding part 41d, a first motor 41e, an input port 41f and a guide roller 41g.

Furthermore, the intermediate wire feeding source 241 is provided with an stored amount detection unit 241h that detects the stored amount of welding wire W. The stored amount detection unit 241h is provided with a bar member 241i with one end rotatably fixed thereto. At the other end of the bar member 241i, a pair of curvature detection rollers 241j that pinch the bent portion of the welding wire W are rotatably supported. If the stored amount of the welding wire W is increased or decreased, the curvature of the welding wire W stored inside the housing 41a changes as illustrated by the two-dot chain lines in FIG. 3, and the bar member 241i pivots around the one end described above. The stored amount detection unit 241h is a rotary position sensor that detects the rotary position of the bar member 241i, and by detecting the rotary position of the bar member 241i, the stored amount detection unit 241h can detect the stored amount of welding wire W, and outputs a detection signal indicating the stored amount to the power supply device 205 via the output port 241k.

It is noted that the stored amount detection unit 241h provided with the rotary position sensor is a mere example, and the stored amount of welding wire W may be optically detected with the use of an infrared sensor or the like. Moreover, a limit switch which is in contact with the stored welding wire W and is turned on or off in accordance with the stored amount of the welding wire W may also be used to configure the stored amount detection unit 241h.

Similarly to the power supply device 5 according to Embodiment 1, the power supply device 205 is provided with a power supply unit 5a, a feed control unit 5b, a first speed instruction output unit 5c, a second speed instruction output unit 5d, and is further provided with a signal input unit 205e to which a detection signal output from the intermediate wire feeding source 241 is input. The power supply device 205 corrects the feeding speed indicated by a speed instruction for the first feeding part 41d based on the detection signal input to the signal input unit 205e, and outputs the corrected speed instruction signal to the first feeding part 41d.

<Deviation Control for Making the Stored Amount of Welding Wire Closer to Predetermined Amount>

Figure 4:
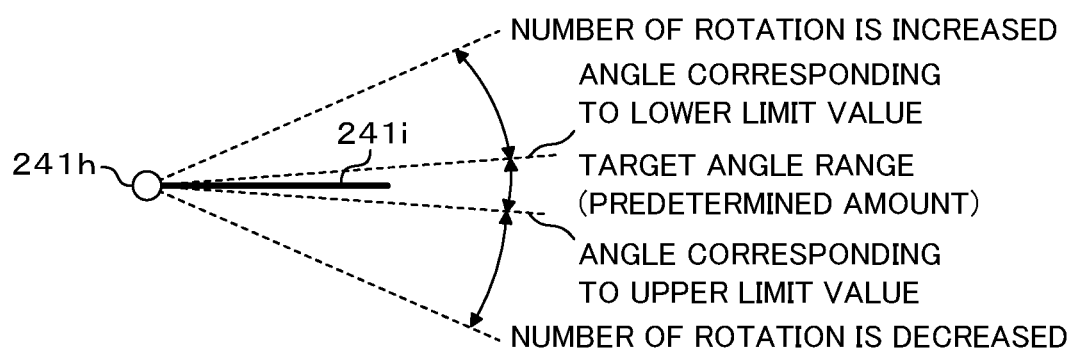
FIG. 4 is a schematic diagram illustrating a correction method for feeding speed.
Figure 5:
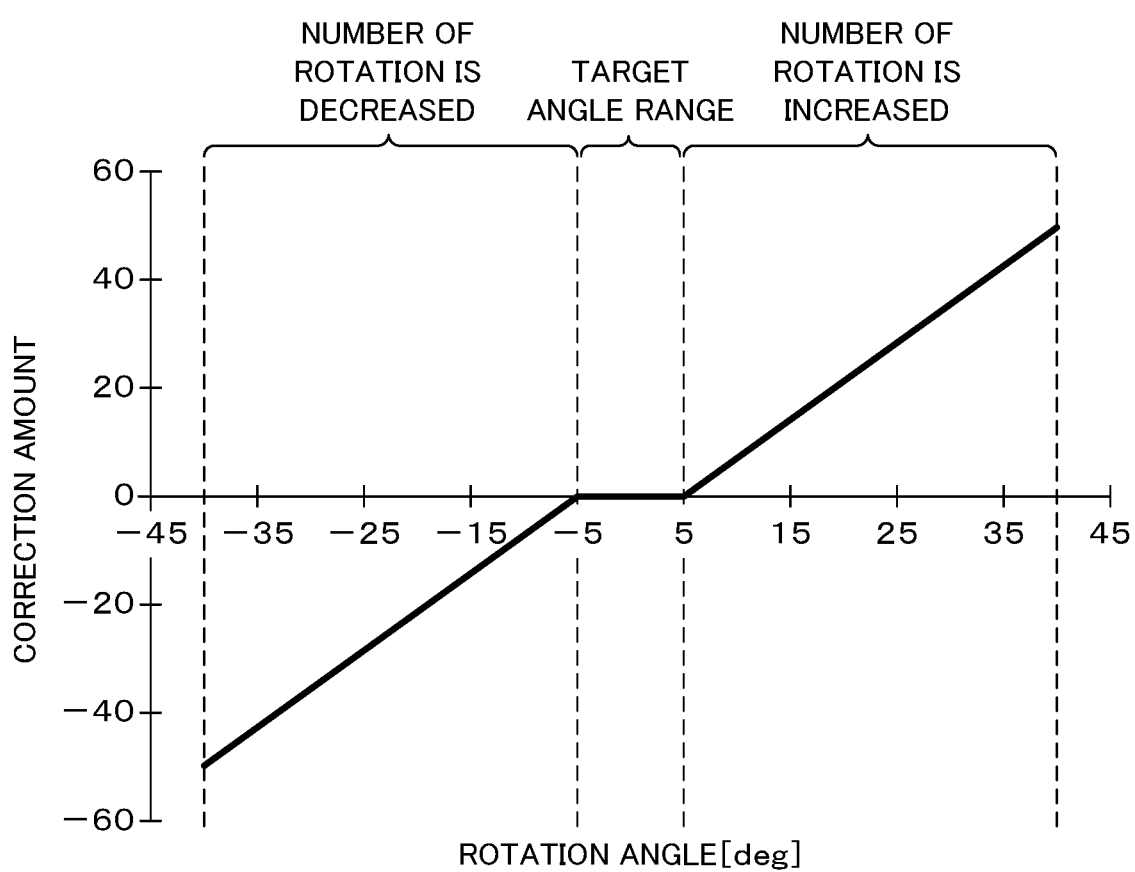
FIG. 5 is a graph illustrating the relationship between a rotation angle of a bar member detected by the stored amount detection unit and a correction amount for feeding speed.

FIG. 4 is a schematic view illustrating a method of correcting feeding speed, and FIG. 5 is a graph illustrating the relationship between the rotation angle of the bar member 241i detected by the stored amount detection unit 241h and a correction amount for feeding speed. In the graph illustrated in FIG. 5, the horizontal axis indicates the rotation angle of the bar member 241i, whereas the vertical axis indicates the correction amount of speed instructions.

As illustrated in FIG. 4, the rotation angle of the bar member 241i is increased or decreased according to the stored amount of welding wire W in the intermediate wire feeding source 241. The rotation angle of the bar member 241i is smaller when the stored amount of welding wire W is increased (clockwise rotation in FIGS. 3 and 4), and is larger when the stored amount of welding wire W is decreased (counterclockwise rotation in FIGS. 3 and 4). A predetermined amount of welding wire W is stored in the intermediate wire feeding source 241. The predetermined amount corresponds to the amount of welding wire W to be stored in the intermediate wire feeding source 241, and has a lower limit and an upper limit. That is, the predetermined amount has a certain width. It is assumed that the rotation angle of the bar member 241i obtained when the stored amount of welding wire W corresponds to an intermediate value between the upper limit and the lower limit is 0 degrees. The target angle range illustrated in FIG. 4 is a rotation angle of the bar member 241i corresponding to the predetermined amount. The rotation angle of the bar member 241i corresponding to the upper limit is −5 degrees, for example, and the rotation angle of the bar member 241i corresponding to the lower limit is 5 degrees.

The feed control unit 5b increases the speed of feeding by the first feeding part 41d if the stored amount of welding wire W is smaller than the lower limit, e.g., if the rotation angle of the bar member 241i is 5 degrees or larger. That is, the number of rotation by the roller of the first feeding part 41d is increased. More specifically, the feed control unit 5b calculates a correction amount (%) proportional to the difference between the rotation angle of the bar member 241i detected by the store amount detection unit 241h and an angle corresponding to the lower limit. The feed control unit 5b then corrects the feeding speed of the first feeding part 41d by adding a value obtained by multiplying the feeding speed before correction, i.e. the feeding speed of the second feeding part 42, by the correction amount (%) to the feeding speed. The feed control unit 5b outputs a speed instruction signal indicating the feeding speed after correction to the first feeding part 41d.

Likewise, the feed control unit 5b decreases the feeding speed of the first feeding part 41d if the stored amount of welding wire W is larger than the upper limit, e.g., if the rotation angle of the bar member 241i is −5 degrees or smaller. That is, the number of rotation by the roller of the first feeding part 41d is decreased. More specifically, the feed control unit 5b calculates a correction amount (%) proportional to the difference between the rotation angle of the bar member 241i detected by the store amount detection unit 241h and an angle corresponding to the lower limit. The feed control unit 5b then corrects the feeding speed of the first feeding part 41d by multiplying the feeding speed before correction, i.e. the feeding speed of the second feeding part 42, by a negative correction amount (%), and adding the value obtained by the multiplication to the feeding speed. The feed control unit 5b outputs a speed instruction signal indicating the feeding speed after correction to the first feeding part 41d.

If the stored amount of welding wire W is in the range from the lower limit to the upper limit, i.e. if the rotation angle of bar member 241i is within the target angle range, the feed control unit 5b does not correct the feeding speed according to the rotation angle. In other words, the feed control unit 5b performs no deviation control based on the difference between the rotation angle of the bar member 241i and a target angle, e.g., 0 degrees.

<Stabilization Control Based on Change Rate of Rotation Angle of Bar Member>

Figure 6:
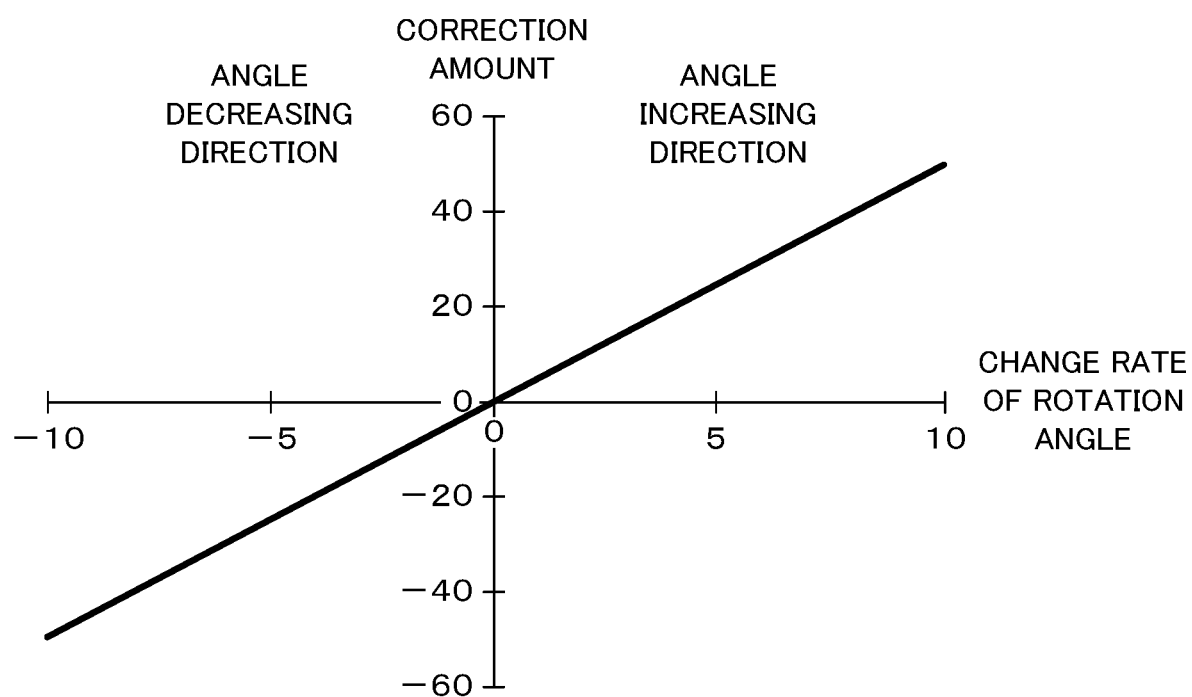
FIG. 6 is a graph illustrating the relationship between a change rate of the rotation angle of a bar member detected by the stored amount detection unit and a correction amount for feeding speed.

FIG. 6 is a graph illustrating the relationship between a change rate of the rotation angle of a bar member 241i detected by the stored amount detection unit 241h and a correction amount for feeding speed. In the graph illustrated in FIG. 6, the horizontal axis indicates the change rate of the rotation angle of the bar member 241i, whereas the vertical axis indicates the correction amount of speed instructions. If the stored amount of welding wire W in the intermediate wire feeding source 241 is in the range of a predetermined amount, the feed control unit 5b corrects the feeding speed of welding wire W fed by the first feeding part 41d in accordance with the change rate of the stored amount. More specifically, the correction amount proportional to the change rate of the rotation angle of the bar member 241i is calculated. The feed control unit 5b then corrects the feeding speed of the first feeding part 41d by adding a value obtained by multiplying the feeding speed before correction, i.e. the feeding speed of the first feeding part 41d, by the correction amount (%) to the feeding speed. The feed control unit 5b outputs a speed instruction signal indicating the feeding speed after correction to the first feeding part 41d.

A speed control procedure will now be described.

Figure 7:
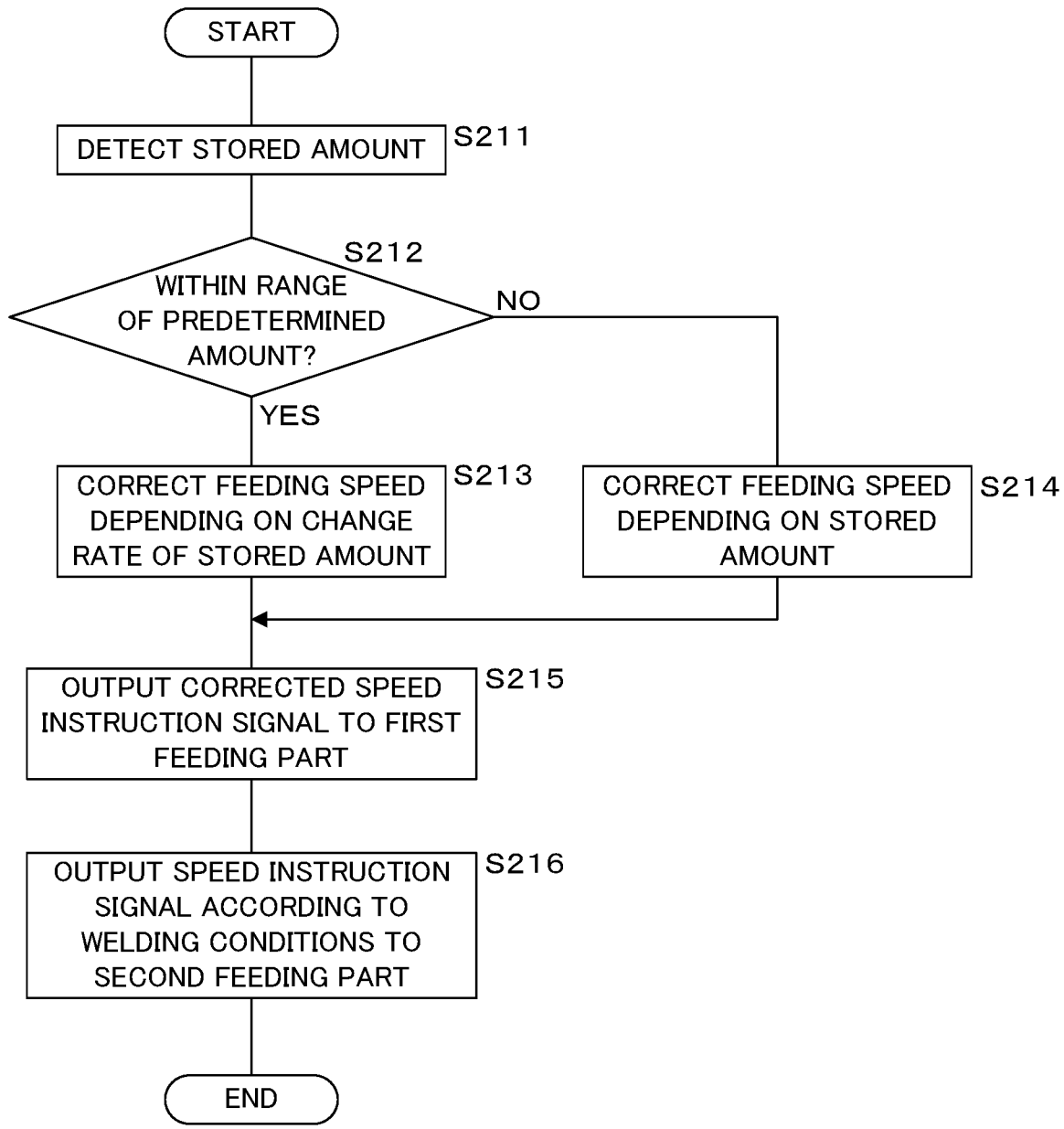
FIG. 7 is a flowchart illustrating a processing procedure performed by a feed control unit according to Embodiment 2.

FIG. 7 is a flowchart illustrating a processing procedure performed by the feed control unit 5b according to Embodiment 2. First, the feed control unit 5b causes the stored amount detection unit 241h to detect the stored amount of welding wire W (step S211), and determines whether or not the stored amount is within the range of a predetermined amount (step S212). If it is determined that the stored amount is in the range of a predetermined amount (YES at step S212), the feed control unit 5b corrects the feeding speed according to welding conditions depending on the change rate of the stored amount as illustrated in FIG. 6 (step S213). If it is determined that the stored amount is out of the range of the predetermined amount (NO at step S212), the feed control unit 5b corrects the feeding speed according to welding conditions depending on the difference between the upper limit or lower limit of the predetermined amount and the stored amount, as illustrated in FIG. 5 (step S214). The feed control unit 5b that has finished the processing of step S213 or S214 outputs a speed instruction signal indicating the corrected feeding speed to the first feeding part 41d via the first speed instruction output unit 5c (step S215). Subsequently, the feed control unit 5b outputs a speed instruction signal indicating the feeding speed according to the welding conditions to the second feeding part 42 via the second speed instruction output unit 5d (step S216).

As described above, if the stored amount of welding wire W in the intermediate wire feeding source 241 is out of the range of the predetermined amount, the feed control unit 5b proportionally controls the feeding speed of welding wire W fed by the first feeding part 41d, and if it is within the range of the predetermined amount, differential control may be performed on the feeding speed of welding wire W fed by the first feeding part 41d.

According to the wire feeding device 204 and the arc welding device according to Embodiment 2 that are configured as described above, the storage amount of welding wire W stored in the housing 41a is monitored so that a predetermined amount of welding wire W is stored in the intermediate wire feeding source 241, which enables stable feeding of the welding wire W from the intermediate wire feeding source 241 to the welding torch 13.

More specifically, if the stored amount of welding wire W in the intermediate wire feeding source 241 is out of the predetermined range, proportional control is performed on the feeding speed of welding wire W fed by the first feeding part 41d. That is, if the stored amount of welding wire W is larger than the upper limit, the stored amount is reduced by correcting the feeding speed of the first feeding part 41d to be lower. If, on the other hand, the stored amount of welding wire W is smaller than the lower limit, the stored amount is increased by correcting the feeding speed of the first feeding part 41d to be higher. Even if a difference is generated in the feeding speed for welding wire W between the first feeding part 41d and the second feeding part 42, the predetermined amount of welding wire W is secured in the intermediate wire feeding source 241, and the welding wire W may stably be fed to the welding torch 13.

Furthermore, some latitude is allowed as to the predetermined amount to be stored in the intermediate wire feeding source 241, which can prevent the feeding speed of welding wire W fed by the first feeding part 41d from unnecessarily varying. In other words, the storage state of the welding wire W in the intermediate wire feeding source 241 may be stabilized.

Furthermore, if the stored amount of welding wire W in the intermediate wire feeding source 241 is in the predetermined range, differential control is performed on the feeding speed of welding wire W fed by the first feeding part 41d. Thus, if the amount of welding wire W stored in the intermediate wire feeding source 241 is in the predetermined range, the speed of feeding by the first feeding part 41d is controlled so that the stored amount is not changed from the current value, which can stabilize the storage state of the welding wire W in the intermediate wire feeding source 241.

Embodiment 3

As the arc welding device and the wire feeding device 304 according to Embodiment 3 are different from those in Embodiment 2 in the configuration of the power supply device 305, the difference will mainly be described below. Since the other configurations and effects are similar to those in Embodiments 1 and 2, corresponding parts are denoted by similar reference codes and detailed description thereof will not be repeated.

Figure 8:
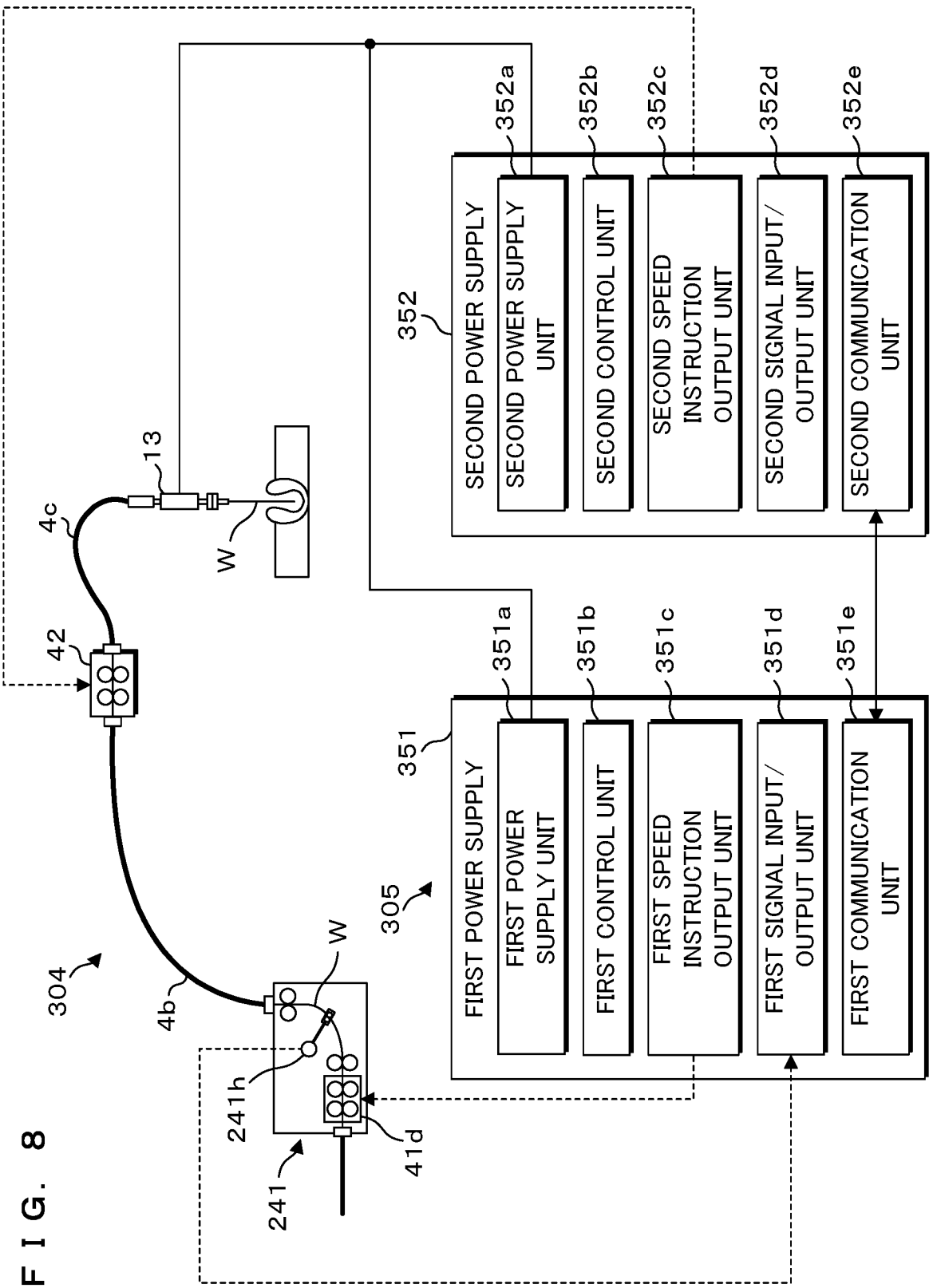
FIG. 8 is a schematic diagram illustrating a configuration example of an arc welding system according to Embodiment 3.

FIG. 8 is a schematic diagram illustrating a configuration example of an arc welding system according to Embodiment 3. The power supply device 305 according to Embodiment 3 includes a first power supply 351 and a second power supply 352 that are connected in parallel to a common load concerning arc welding, to feed electricity to the load, and is able to output large current. The first power supply 351 and the second power supply 352 are connected with each other by a communication line.

The second power supply 352 transmits PWM control information to the first power supply 351 through a communication line, to function as a master power supply that controls the outputs of the first and second power supplies 351 and 352. The first power supply 351 receives the PWM control information transmitted from the second power supply 352, and functions as a slave power supply that controls the output based on the received PWM control information.

The second power supply 352 includes a second power supply unit 352a, a second control unit 352b, a second speed instruction output unit 352c, a second signal input/output unit 352d, and a second communication unit 352e. The second power supply unit 352a, the second control unit 352b and the second speed instruction output unit 352c are configured similarly to those in the power supply device 5 described in Embodiment 2. The second control unit 352b causes the second speed instruction output unit 352c to output speed instruction signals to the second feeding part 42, to control the speed of feeding the welding wire W by the second feeding part 42.

The second signal input/output unit 352d is a terminal connected to an external device, and receives input/output of signals. To the terminal, an operation device for operating an arc welding device is connected, for example.

The second communication unit 352e is a communication circuit for transmitting and receiving various information to/from the first power supply 351. The second communication unit 352e transmits and receives information according to the host control interface (HCI) communication protocol, for example.

The second power supply 352 which employs a master power mode as the operation mode transmits through the second communication unit 352e the speed information of the second feeding part 42 and the PWM control information calculated at the second power supply unit 352a of its own device to the first power supply 351 operating in the slave mode.

The first power supply 351 is configured similarly to the second power supply 352, and includes a first power supply unit 351a, a first control unit 351b, a first speed instruction output unit 351c, a first signal input/output unit 351d and a first communication unit 351e. The first power supply 351 receives, by the first communication unit 351e, the speed information and PWM control information transmitted from the second power supply 352 operating in the master power mode. The first power supply unit 351a outputs welding current based on the received PWM control information.

An stored amount detection unit 241h is connected to the first signal input/output unit 351d, and a signal indicating the result of detection performed by the stored amount detection unit 241h is input to the first signal input/output unit 351d. The first signal input/output unit 351d is configured similarly to the second signal input/output unit 352d. In the case where the first power supply 351 is used as a master power supply, an external device, e.g., an operation device for operating the arc welding device, may be connected to the first signal input/output unit 351d.

The first control unit 351b corrects the speed information received at the first communication unit 351e based on the signals input to the first signal input/output unit 351d, and outputs speed instruction signals indicating the corrected speed information from the first speed instruction output unit 351c to the first feeding part 41d. The method of correcting the feeding speed of the first feeding part 41d is as described in Embodiment 2, and the first control unit 351b causes the first speed instruction output unit 351c to output speed instruction signals to the first feeding part 41d, to control the speed of feeding the welding wire W by the first feeding part 41d.

A speed control procedure will now be described.

Figure 9:
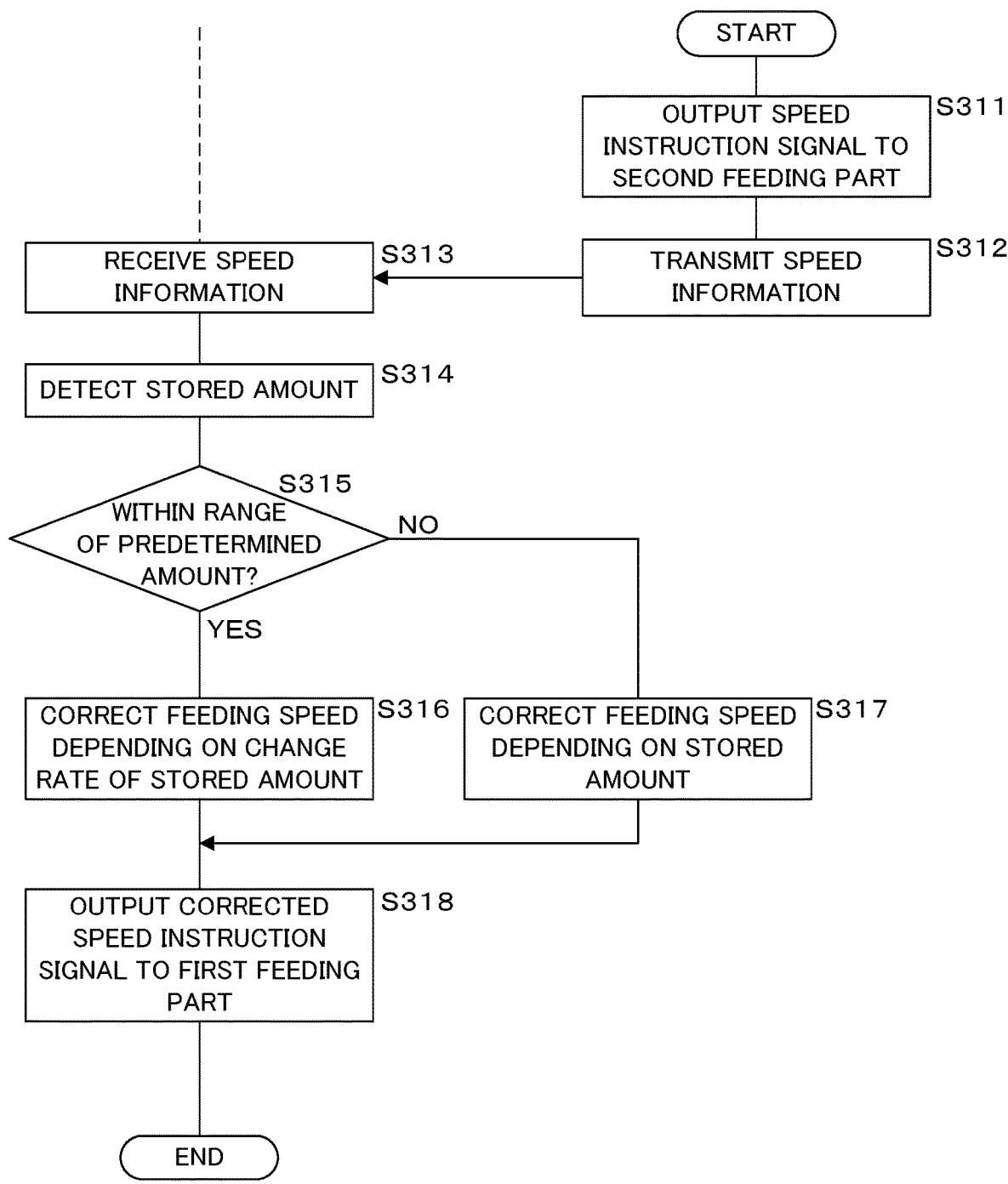
FIG. 9 is a flowchart illustrating a processing procedure for the first control unit and the second control unit according to Embodiment 3.

FIG. 9 is a flowchart illustrating a processing procedure for the first control unit 351b and the second control unit 352b according to Embodiment 3. First, the second control unit 352b of the second power supply 352 outputs speed instruction signals indicating the feeding speed in accordance with the welding conditions to the second feeding part 42 through the second speed instruction output unit 352c, to control the speed of feeding by the second feeding part 42 (step S311). Subsequently, the second control unit 352b transmits the speed information indicating the feeding speed of the second feeding part 42 to the first power supply 351 through the second communication unit 352e (step S312).

The first control unit 351b of the first power supply 351 receives, by the first communication unit 351e, the speed information transmitted from the second power supply 352 (step S313). Subsequently, the first control unit 351b causes the stored amount detection unit 241h to detect the stored amount of welding wire W (step S314), and determines whether or not the stored amount is within the range of the predetermined amount (step S315). If it is determined that the stored amount is in the range of the predetermined amount (YES at step S315), the first control unit 351b corrects the feeding speed indicated by the received speed information in accordance with the change rate of the stored amount as illustrated in FIG. 6 (step S316). If it is determined that the stored amount is out of the range of the predetermined amount (NO at step S315), the first control unit 351b corrects the feeding speed indicated by the received speed information in accordance with the difference between the stored amount and the upper limit or lower limit of the predetermined amount, as illustrated in FIG. 5 (step S317). The first control unit 351b that has finished the processing of step S316 or S317 outputs speed instruction signals indicating the corrected feeding speed to the first feeding part 41d via the first speed instruction output unit 351c (step S318).

According to the wire feeding device 304 and arc welding device according to Embodiment 3 configured as described above, even in the configuration where each of the first power supply 351 and the second power supply 352 is provided with only one port for outputting a speed instruction to the first feeding part 41d or the second feeding part 42, i.e. the first speed instruction output unit 351c or the second speed instruction output unit 352c, the feeding speed of welding wire W by both the first feeding part 41d and the second feeding part 42 may be controlled.

While Embodiment 3 described the configuration where the first power supply 351 and the second power supply 352 respectively control the speed for the first feeding part 41d and the second feeding part 42, three or more power supplies may be connected in parallel. In such a case, additional sets of intermediate wire feeding sources and the first feeding parts may be provided, and multiple power supplies may control the speed of feeding the welding wire W by multiple first feeding parts and second feeding parts.

While Embodiment 3 described the configuration where the first power supply 351 serving as a slave power supply controls the feeding by the first feeding part 41d and the configuration where the second power supply 352 serving as a master power supply controls the feeding by the second feeding part 42, it is, to the contrary, also possible for the second power supply 352 of the master power supply to control the feeding of the first feeding part 41d, and for the first power supply 351 of the slave power supply to control the feeding of the second feeding part 42.

Embodiment 4

As an arc welding device and a wire feeding device 404 according to Embodiment 4 are different from those in Embodiment 1 in that the wire feeding source 3 is further provided with a third feeding part 443, the difference will mainly be described below. Since the other configurations and effects are similar to those in Embodiment 1, corresponding parts are denoted by similar reference codes and detailed description thereof will not be repeated.

Figure 10:
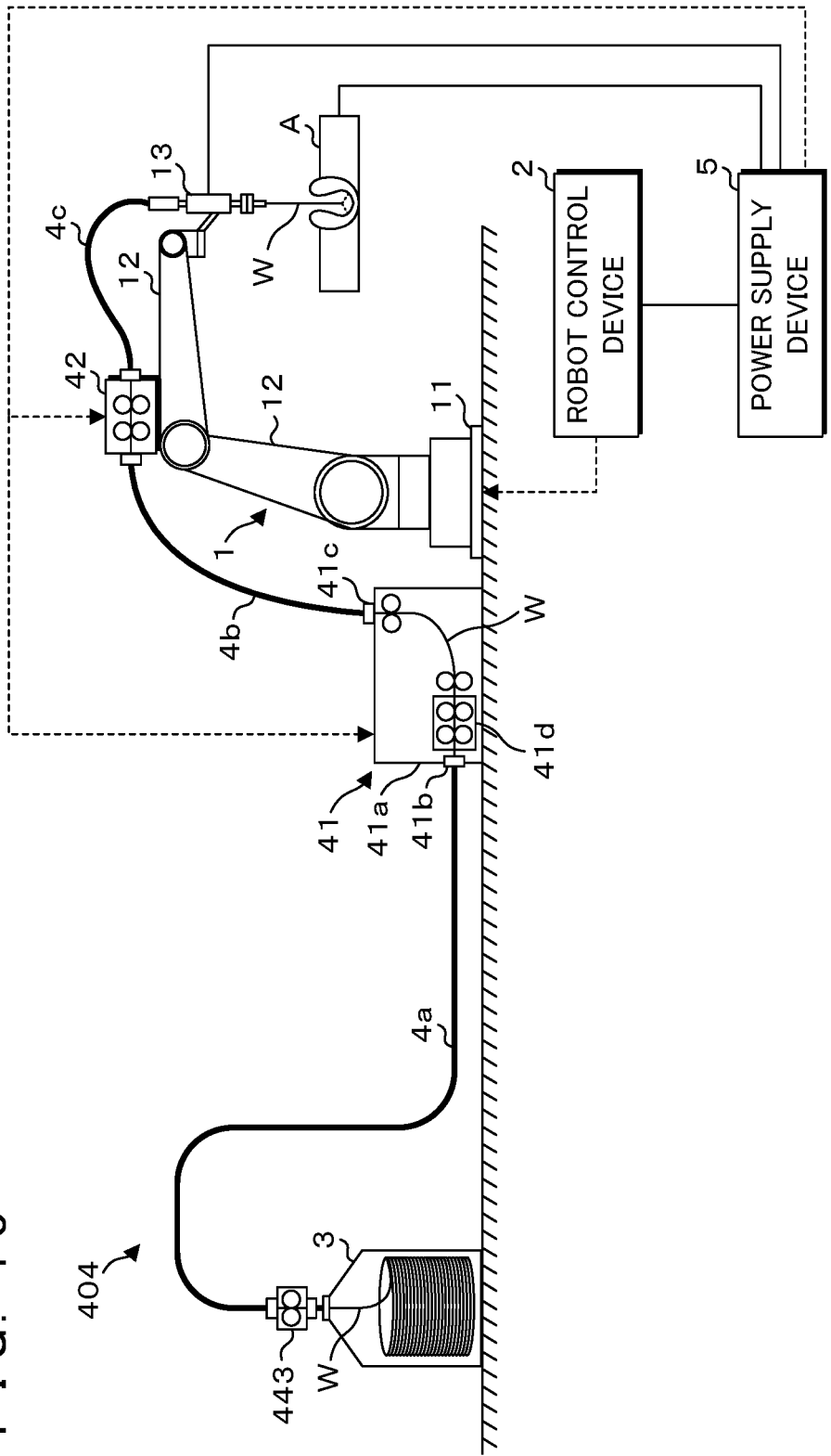
FIG. 10 is a schematic diagram illustrating a configuration example of an arc welding system according to Embodiment 4.

FIG. 10 is a schematic diagram illustrating a configuration example of an arc welding system according to Embodiment 4. The wire feeding device 404 according to Embodiment 4 is provided with a third feeding part 443 that pulls out the welding wire W from the wire feeding source 3 and pushes it out to the intermediate wire feeding source 41. The third feeding part 443 is provided with, for example, a roller on which torque control is performed, and the feeding of welding wire W fed by the third feeding part 443 is controlled by the power supply device 5.

According to Embodiment 4, the third feeding part 443 allows for stable feeding of welding wire W to the welding torch 13.

It should be understood that the embodiments disclosed herein are illustrative and non-restrictive in every respect. Since the scope of the present invention is defined by the appended claims rather than by the description preceding them, all changes that fall within metes and bounds of the claims, or equivalence of such metes and bounds thereof are therefore intended to be embraced by the claims.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE NUMERALS 1 welding robot
2 robot control device 3 wire feeding source
4, 204, 304, 404 wire feeding device
4a first conduit cable
4b second conduit cable
4c third conduit cable
5, 205, 305 power supply device
5a power supply unit
5b feed control unit
5c, 351c first speed instruction output unit
5d, 352c second speed instruction output unit
11 base
12 arm
13 welding torch
41, 241 intermediate wire feeding source
41a housing
41b inlet part
41c outlet part
41d first feeding part
41e first motor
41f input port
41g guide roller
42 second feeding part
42a second motor
205e signal input unit
241h stored amount detection unit
241i bar member
241j curvature detection roller
241k output port
351 first power supply
351a first power supply unit
351b first control unit
351d first signal input/output unit
351e first communication unit
352 second power supply
352a second power supply unit
352b second control unit
352d second signal input/output unit
352e second communication unit
443 third feeding part
A base material
W welding wire

The invention claimed is:

1. An arc welding device of a consumable electrode type comprising:
a wire feeding device that feeds welding wire from a wire feeding source to a welding torch, and
a power supply device that supplies welding current to the welding wire to be fed to a base material by the wire feeding device, the power supply device including a first power supply and a second power supply that are connected in parallel,
wherein the wire feeding device comprises:
an intermediate wire feeding source that is disposed between the wire feeding source and the welding torch and is configured to temporarily store the welding wire fed from the wire feeding source and to feed the stored welding wire to the welding torch;
a first feeder that feeds the welding wire of the wire feeding source to the intermediate wire feeding source, the first power supply being operatively coupled to a first motor of the first feeder and configured to control speed of feeding by the first feeder;
a second feeder that feeds the welding wire stored in the intermediate wire feeding source to the welding torch, the second power supply being operatively coupled to a second motor of the second feeder and configured to control speed of feeding by the second feeder; and
a detector that detects an amount of the welding wire stored in the intermediate wire feeding source,
wherein the first power supply comprises:
a communication circuit;
a single first signal input terminal that is connected to the detector; and
a first speed instruction output terminal that outputs a speed instruction signal to the first feeder,
wherein the second power supply comprises:
a communication circuit;
a single second signal input terminal; and
a second speed instruction output terminal that outputs a speed instruction signal to the second feeder,
wherein
the communication circuit of the second power supply is configured to transmit speed information indicating the feeding speed of the welding wire fed by the second feeder to the first power supply,
the communication circuit of the first power supply is configured to receive the speed information transmitted from the second power supply, and
the first power supply is configured to correct the speed of feeding by the first feeder such that a predetermined amount of welding wire is stored in the intermediate wire feeding source based on a detection result obtained by the detector and control the speed of feeding by the first feeder based on the speed information received by the communication circuit of the first power supply.

* * * * *